UNITED STATES PATENT OFFICE.

AMAURY SIMON AND VICTOR PETIT, OF ST. NICOLAS DE REDON, FRANCE.

PROCESS OF MANUFACTURING ARTIFICIAL STONE OR METAL.

SPECIFICATION forming part of Letters Patent No. 272,786, dated February 20, 1883.

Application filed September 21, 1882. (No specimens.) Patented in France November 14, 1881, No. 145,742; in Belgium May 22, 1882; in England May 22, 1882, No. 2,401; in Austria May 27, 1882; in Spain May 27, 1882; in Sweden May 27, 1882; in Italy May 29, 1882; in Denmark June 3, 1882; in Russia June 9, 1882; in Germany July 3, 1882, and in Norway July 7, 1882.

*To all whom it may concern:*

Be it known that we, AMAURY SIMON and VICTOR PETIT, citizens of the French Republic, residing at St. Nicolas de Redon, in the French Republic, have invented certain new and useful Improvements in Process of Manufacturing Artificial Stone or Metal; and we do hereby declare that the following is a full, clear, and exact description of the invention, which will enable others skilled in the art to which it appertains to make and use the same.

Researches having for their object the agglomeration of all mineral substances adapted for use in the manufacture of millstones, artificial marble, grinding or polishing stones, mountings for precious stones, files, &c., have led us to experiment with various mineral and vegetable substances. Bitumen, rosin, or colophony as a basis of our new composition of matter have been separately experimented with, and, as we have supposed, found them insufficient for the results which we desired to obtain. We have also vulcanized these substances and have obtained much better results; yet, although of great resistances, these vulcanites did not fully answer our purposes. We have finally added to these substances another vegetable substance—namely, gum-lac for its adhesive or agglomerating qualities and to destroy its greasy or sticky nature, which is its principal defect, by mineralizing the same without destroying its agglomerating qualities, and in this we have found the desired results. Bitumen and asphaltum vulcanized by means of sulphur produce the combination of mineralization, the rosin or colophony being employed as a flux for the gum-lac. The colophony has also the property of imparting to the product a clear sound, which is of great importance, as it provides a test by which the slightest flaw may be detected, and by this simple means accidents may be readily avoided, especially in the manufacture of artificial millstones, where a flaw may result in serious accidents.

In carrying out our invention we first melt the colophony or rosin in a suitable cast-iron vessel, and when thoroughly melted we add the bitumen and the asphaltum. This compound is constantly agitated until the latter substances are nearly melted, and then we add the sulphur and keep the mass well stirred until all the component parts thereof are thoroughly melted and intimately mixed. We then add the gum-lac in a powdered condition and mix the same intimately with the other substances. This compound has the great advantage over all others heretofore employed in agglomerating processes in the fact that it may be prepared in advance of its use and kept any length of time or shipped to any distance for use without danger of deterioration or alteration, and when it is desired to use the same it will only be necessary to melt it and mix therewith the substance to be agglomerated; or the compound may be used as soon as made and while yet in a fluid condition. This compound having the requisite qualities of a perfect agglomeration, there remained nothing to be done but to determine the relative proportions of the agglomerating compound and of the substance or material to be agglomerated. This quantity we have found to be variable according to the nature of the product to be obtained, and also according to the hardness such product is to have, which latter may require to be soft or medium hard, or hard, or very hard. Under these conditions we have found the following proportions to give excellent results, to wit: For soft products we use the compound in the proportion of one-eighth to one of the substance to be agglomerated—that is to say, if we take one kilogram of the substance to be agglomerated as the unit standard for soft products, we mix one kilogram of said substance with one-eighth kilogram of the compound or agglomerating material, for medium hard products one-seventh, for hard products one-sixth, and for very hard products one-fifth, per kilogram of the substance to be agglomerated.

In the preparation of the agglomerating composition we have found the following to be the best proportions of ingredients, to wit: gum-lac, fifty parts; colophony or rosin, ten parts; bitumen, fifteen parts; asphaltum, fifteen parts; and sulphur, ten parts. These proportions will, however, slightly vary, according to the size of the pieces or grains of the substance to be agglomerated as well as the hardness the product is to have. The process of manufacture of the artificial metallic or other agglomerate may be briefly described as follows: A given quantity of the agglomerating compound is heated in a suitable iron vessel until it is about to melt, when the material to be agglomerated—such as metal, stone, or other substances previously reduced to small pieces—may be mixed with the compound and the mass stirred until the compound is entirely melted and an intimate and thorough mixture of the two is effected. The agglomerate is then removed and molded to the desired shape or form and subjected to pressure. The amount of pressure will necessarily depend upon the size of the article, and will increase in proportion to the volume of such article. For instance, for a millstone having a diameter of one meter and a thickness of twenty centimeters, a pressure of at least eight hundred thousand kilograms will be required. After the articles have been pressed they are removed from the mold and allowed to cool, after which they are baked by subjecting the same to about 50° or 60° of heat, and are allowed to remain in this condition until all evaporation ceases. After the articles cease smoking they may be withdrawn from the baking-furnace and allowed to cool, when they will be ready for use.

We would here remark that the combination of the mineralization is only effected by the baking. Articles that are well baked—that is to say, of perfect mineralization—are thoroughly agglomerated.

Having now described our invention, what we claim is—

1. The herein-described vulcanite, composed of bitumen, asphaltum, rosin or colophony, gum-lac, and sulphur, substantially as and for the purpose specified.

2. The herein-described agglomerate, composed of a metal, stone, or other substance, and a vulcanized binding composed of bitumen, asphaltum, rosin or colophony, gum-lac, and sulphur, in or about in the proportion specified.

3. As a new article of manufacture, an artificial stone or metal, as herein described, composed of comminuted metal or stone and a vulcanized binding compound, substantially as and for the purposes specified.

In testimony that we claim the foregoing we have hereunto set our hands.

AMAURY SIMON.
VICTOR PETIT.

Witnesses:
F. MATRAY,
LOUIS COUNAINT.